E. P. WARNER.
POWER TRANSMISSION DEVICE.
APPLICATION FILED MAR. 30, 1908.

917,205.

Patented Apr. 6, 1909.
2 SHEETS—SHEET 1.

Witnesses:

Inventor
Edward Percy Warner
by Frank D. Thomason
Atty.

E. P. WARNER.
POWER TRANSMISSION DEVICE.
APPLICATION FILED MAR. 30, 1908.

917,205.

Patented Apr. 6, 1909.
2 SHEETS—SHEET 2.

Witnesses

Inventor
Edward Percy Warner
by Frank D. Thomson
Atty

UNITED STATES PATENT OFFICE.

EDWARD PERCY WARNER, OF CHICAGO, ILLINOIS, ASSIGNOR TO WARNER CLUTCH COMPANY, OF CHICAGO, ILLINOIS, A CORPORATION OF ILLINOIS.

POWER-TRANSMISSION DEVICE.

No. 917,205.  Specification of Letters Patent.  Patented April 6, 1909.

Application filed March 30, 1908. Serial No. 424,158.

*To all whom it may concern:*

Be it known that I, EDWARD PERCY WARNER, a citizen of the United States, and a resident of Chicago, in the county of Cook and State of Illinois, have invented certain new and useful Improvements in Power-Transmission Devices, of which the following is a clear, full, and exact description.

My invention relates to means for transmitting the power and motion of a driving-shaft to a driven-shaft, such for instance, as in a motor propelled vehicle or automobile where the connection is generally made between shafts at a time when the motor is running at full speed and the axle or driven-shaft is stationary.

It is the object of my invention to make this connection in such manner that the speed of the driven-shaft will be gradually accelerated and avoid any jar or jerk on the driven parts at the time the connection is made. This I accomplish by the means hereinafter fully described and as more particularly pointed out in the claims.

Figure 1:
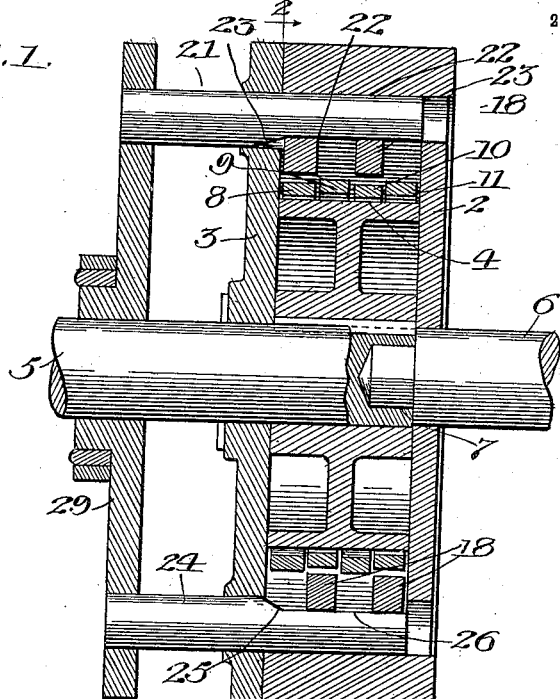
Figure 2:
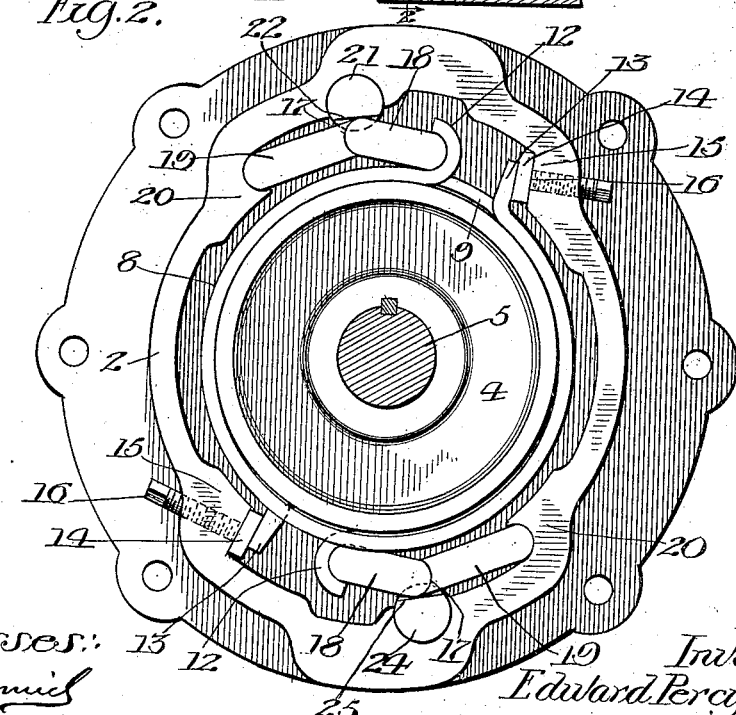
Figure 3:
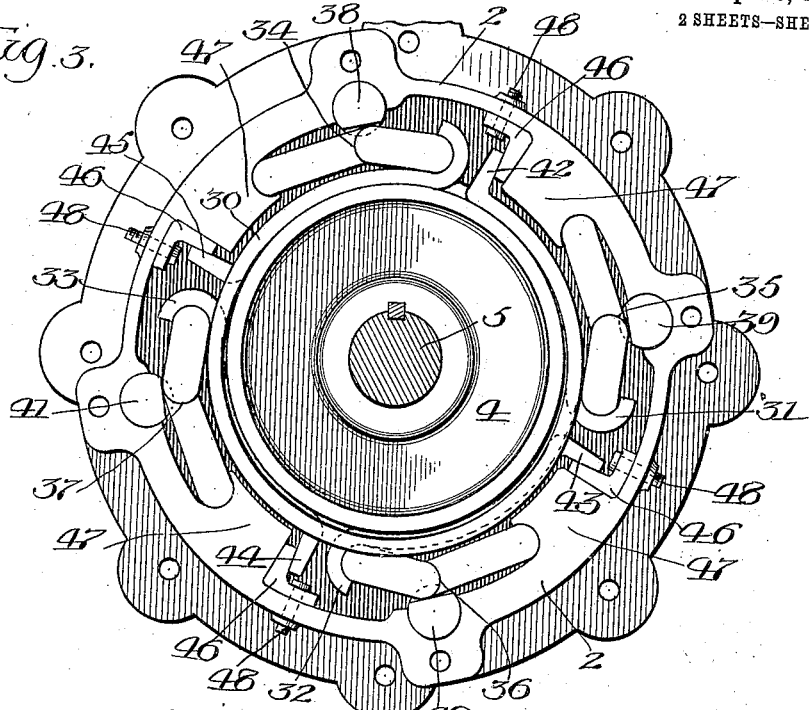
Figure 4:
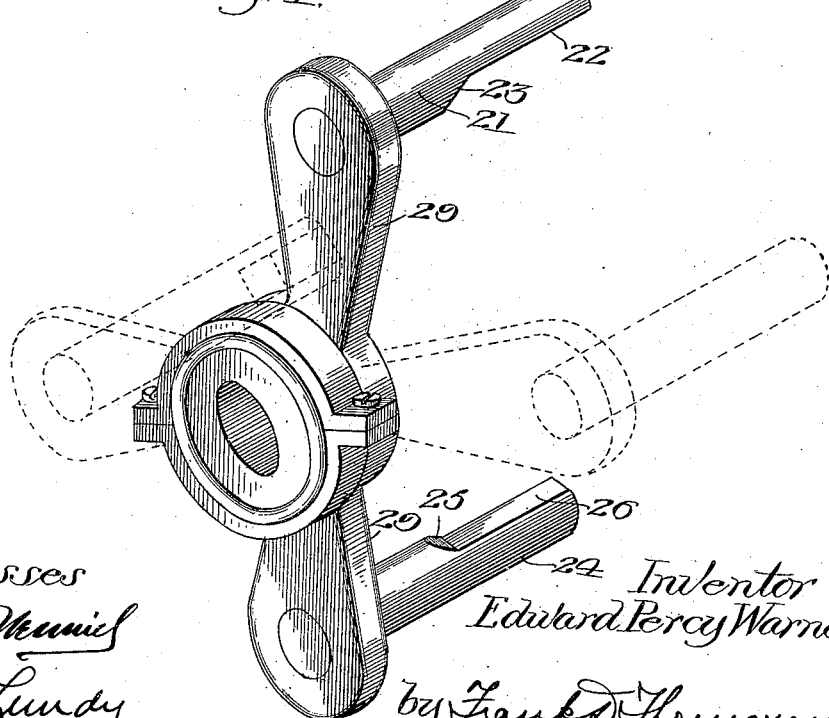

In the drawings:—Figure 1 is a central vertical section taken longitudinally through the driving and driven shafts and transversely through the clutch mechanism. Fig. 2 is a vertical section thereof taken on line 2—2, Fig. 1. Fig. 3 is a view similar to Fig. 2 showing a modified arrangement of the clutch bands. Fig. 4 is a detail view of the yoke used in connection with my invention.

Referring to the drawings, 2 represents a suitable housing, preferably circular in shape that is closed on its open side by a removable head or plate 3 fitted thereon. This housing preferably surrounds a suitable drum 4 arranged concentrically within the same and is keyed or otherwise secured to the end of a shaft 5 the axis of which alines with the axis of the housing. Projecting axially beyond the end of this shaft 5 is another shaft 6 the reduced end of which is journaled in a recess 7 in the abutting end of shaft 5, and said shaft 6 is firmly secured to the housing in any suitable manner.

Surrounding the circumferential face of drum 4 and preferably out of contact therewith, is a series of separate substantially circular bands 8, 9, 10, and 11, (or if desired but two bands may be used), the combined width of said bands being sufficient to entirely surround and envelop the circumference of the drum without interfering with each other. The ends 12 and 13 of these bands preferably approach each other and are bent outwardly as shown, and, in order to more successfully accomplish the purpose of my invention, the ends of said bands are preferably arranged to alternate with each other at points on opposite sides of the drum. For example, as shown in Fig. 1, the ends of bands 8 and 10 are on the upper segment of the drum while the ends of bands 9 and 11 terminate on the lower segment thereof. The ends 13 preferably remain stationary during the successive frictional engagement of the bands with the drum and are so arranged that they abut against suitable adjusting plates 14 that are disposed between the upturned ends of said bands and the beveled or inclined sides of lugs 15 projecting inward from the inside of the circumferential wall of the housing. In order to provide an automatic adjustment of these bands the sides of the ends 13 may be beveled so as to flatly engage the faces of the plates. In order to make a more positive adjustment these plates are preferably engaged by suitable set-screws 16 tapped tangentially through the lugs 15 of the housing, the loosening or tightening of which from the exterior moves said plates toward or away from the bands and properly adjusts the same with relation to the drum. The circumference of the inner portions of these bands is slightly greater than the outside circumference of the drum and their ends 12 are preferably made hook-shaped as shown. These ends form suitable seats for the outer rounded ends of links 18 that are each the same width as their respective bands and which form one member of the toggles 17. The opposite ends of said links 18 are likewise rounded and engage and are seated in the concave ends of the opposing links 19 of said toggle. The ends of links 19 opposite the concave seat are, preferably, rounded and are seated in suitable recesses formed on the adjacent sides of lugs 20 projecting inward from the inside circumference of the walls of the housing. There are, preferably, two sets of these toggles arranged in pairs at points diametrically opposite each other, substantially as shown in Fig. 2 of the drawings, so that the bands will be engaged alternately at one side and then on the opposite side of the drum. For example, the first band, 8, is shown with its toggle on the upper side of the housing, while band 9 which is the second band has its toggle on the lower side of the housing. The apexes or knuckles of these toggles 17 that operate bands 8 and 10 are engaged by suitable spindle or plunger 21 that moves transversely across the toggles. A portion of the circumference of plunger 21 is flattened (as shown at 22) so as to pass over or escape its respective toggles for a predetermined distance and when said plunger has nearly reached the limit of its thrust an inclined or wedge shaped surface 23 will engage and depress the toggles in the desired manner to cause the bands to be brought into frictional contact with the drum. This plunger is journaled in suitable bearings in the face-plate of the housing and its inclined portion is so arranged that it will engage the toggles and clamp the bands separately around the drum independent of each other. Bands 9 and 11 are engaged by suitable toggles as above described, and the apexes thereof depressed by the inclined face 25 of a plunger 24 that is likewise provided with a flattened inner surface 26. The arrangement of this plunger and the inclined face thereon is such that the bands will be caused to frictionally engage the drum *seriatim*, or one after the other as said plungers are simultaneously moved inward, or they may be arranged to bring all of the bands simultaneously into frictional engagement with the drum. These plungers 21 and 24 extend beyond their bearings in plate 3 and have their outer ends secured to a suitable yoke 29 slidably mounted on shaft 5. As this yoke is moved toward the housing, the plungers move simultaneously into the casing and permit the flattened faces thereof to pass over the apices of the toggles the proper distance until the inclined faces contact therewith and gradually compress the toggles in such manner as to cause the several bands to engage the drum.

In the modified construction shown in Fig. 3 there are four bands shown, namely: 30, 31, 32, and 33, each of which is engaged by its respective toggle 34, 35, 36 and 37. The ends of these bands and toggles are preferably arranged in successive order around the inner side of the walls of the housing, in other words, they are arranged equi-distant or at quadrants around the circumference of the drum. In this instance the plungers 38, 39, 40 and 41 are mounted on a yoke provided with four equi-distant arms as suggested in dotted lines in Fig. 4 of the drawings. The means for adjusting these bands are slightly different from those described in connection with the preferred form of my invention. This is accomplished by bending the ends 42, 43, 44 and 45 of the bands so that they will abut against the wedge-shaped members of suitable L-shaped plates 46. These wedges fit and extend across the longitudinal inclined edges of lugs 47 on the inside circumference of the casing, while the contacting faces of the ends of the bands are correspondingly beveled. In order to take up any slack, due to wear or otherwise, said L-shaped members are adjusted by the engagement therewith of suitable set-screws 48 tapped through the housing, which when tightened or loosened from the exterior moves said members toward or away from said bands and adjusts their relation to the drum. The operation of this modified construction is substantially the same as that of the preferred form of my invention as above described.

What I claim as new is:—

1. A power transmission device comprising a driving member, an alining driven member, a series of bands each surrounding one of said members the position of the ends of each of which are located at circumferentially arranged points upon said last mentioned member, and longitudinally movable means adapted to engage the ends of each of said bands independently of the others.

2. A power transmission device comprising a driving member, an alining driven member, a series of bands each surrounding one of said members the position of the ends of each of which are located at circumferentially arranged points upon said last mentioned member, and longitudinally movable means adapted to engage the ends of each of means adapted to engage the ends of each of said bands independently of the other bands and one after the other.

3. A power transmission device comprising a driving member, an alining driven member, a series of bands each surrounding one of said members the position of the ends of each of which are located at circumferentially arranged equi-distant points upon the last mentioned member, and longitudinally movable means adapted to engage the ends of each of said bands independently of the others.

4. A power transmission device comprising a driving member, an alining driven member, a series of bands each surrounding one of said members the position of the ends of each of which are located at circumferentially arranged equi-distant points upon said last mentioned member, and longitudinally movable means adapted to engage the ends of each of said bands independently of the other bands and one after the other.

5. A power transmission device comprising a driving member, an alining driven member, a drum mounted on one of said members, a series of bands each surrounding said drum the position of the ends of each of which are located at circumferentially arranged points upon said drum, and longitudinally movable means adapted to engage the ends of each of said bands independently of the others.

6. A power transmission device comprising a driving member, an alining driven member, a drum mounted on one of said members, a series of bands each surrounding said drum the position of the ends of each of which are located at circumferentially arranged points upon said drum, and longitudinally movable means adapted to engage the ends of each of said bands independently of the other bands and one after the other.

7. A power transmission device comprising a driving member, an alining driven member, a drum mounted on one of said members, a series of bands each surrounding said drum the position of the ends of each of which are located at circumferentially arranged equi-distant points upon said drum, and longitudinally movable means adapted to engage the ends of each of said bands independently of the other bands and one after the other.

8. A power transmission device comprising a driving member, an alining driven member, a drum mounted on one of said members, a casing secured to the other member and inclosing said drum, a series of bands each surrounding said drum and having one end engaging said casing, the position of the ends of each of said bands being located at circumferentially arranged points on said drum, and means adapted to independently engage the unsecured ends of said bands.

9. A power transmission device comprising a driving member, an alining driven member, a drum mounted on one of said members, a casing secured to the other member and inclosing said drum, a series of bands each surrounding said drum and having one end engaging said casing, the position of the ends of each of said bands being located at circumferentially arranged points on said drum, and means adapted to independently engage the unsecured ends of said bands one after the other.

10. A power transmission device comprising a driving member, an alining driven member, a drum mounted on one of said members, a casing secured to the other member and inclosing said drum, a series of bands each surrounding said drum and having one end engaging said casing, the position of the ends of each of said bands being located at circumferentially arranged equi-distant points on said drum, and means adapted to independently engage the unsecured ends of said bands one after the other.

11. A power transmission device comprising a driving member, an alining driven member, a series of separate independent bands unattached to but engaging one of said members and each surrounding the other member, the ends of said bands terminating at points diametrically opposite each other, and longitudinally movable plungers for separately engaging said bands and causing them to frictionally engage the member surrounded thereby.

12. A power transmission device comprising a driving member, an alining driven member, a drum on one of said members, a series of separate independent bands surrounding said drum, the ends of said bands terminating at points diametrically opposite each other, and longitudinally movable plungers for separately engaging said bands and causing the same to frictionally engage said drum.

13. A power transmission device comprising a driving member, an alining driven member, two series of separate independent bands unattached to but engaging one of said members and surrounding the other member and arranged so that one of said series terminates on one side of said surrounded member and the other series terminates at a point diametrically opposite, and longitudinally movable plungers for separately engaging said bands and causing them to frictionally engage the member surrounded thereby.

14. A power transmission device comprising a driving member, an alining driven member, a drum on one of said members, two series of separate independent bands surrounding said drum the ends of the bands in one series terminating on one side of said drum and those of the other series terminating at a point diametrically opposite, and longitudinally movable plungers for separately engaging said bands and causing the same to frictionally engage said drum.

15. A power transmission device comprising a driving member, an alining driven member, a series of separate independent bands unattached to but engaging one of said members and each surrounding the other member the ends of said bands terminating at different points around the circumference of said last mentioned member, and longitudinally movable plungers for separately engaging said bands and causing them to frictionally engage the member surrounded thereby.

16. A power transmission device comprising a driving member, an alining driven member, a drum on one of said members, a series of separate independent bands each surrounding said drum, the ends of said bands terminating at different points around the circumference of said drum, and longitudinally movable plungers for separately engaging said bands and causing them to frictionally engage the same.

17. A power transmission device comprising a driving shaft, a driven shaft alining therewith, a casing secured to one of said shafts and inclosing the adjacent end of the other shaft, a series of separate independent bands engaging said casing and surrounding said last mentioned shaft, the ends of said bands terminating at points diametrically opposite each other, and means on opposite sides of said casing for separately engaging the free ends of said bands and causing the same to frictionally engage said shaft.

18. A power transmission device comprising a driving shaft, a driven shaft alining therewith, a drum mounted on one of said shafts, a casing secured to the other shaft and surrounding said drum, a series of separate independent bands engaging said casing and surrounding said drum the ends of said bands terminating at points on diametrically opposite sides of said casing, and means mounted in opposite sides of said casing for separately engaging said bands and causing the same to frictionally engage said drum.

19. A power transmission device comprising a driving-shaft, an alining driven-shaft, a drum mounted on one of said shafts, a casing secured to the other shaft and inclosing said drum, a series of bands each surrounding said drum and having one end engaging said casing, the position of the ends of each of said bands being located at circumferentially arranged points on said drum, and means adapted to independently engage the unsecured ends of said bands and cause the same to frictionally engage said drum.

20. A power transmission device comprising a driving shaft, an alining driven-shaft, a drum mounted on one of said shafts, a casing secured to the other shaft and inclosing said drum, a series of bands surrounding said drum and having one end engaging said casing, the position of the ends of each of said bands being located at circumferentially arranged points on said drum, a series of toggles engaging the free ends of said bands, and means adapted to engage said toggles and cause the same to force the ends of said bands together.

21. A power transmission device comprising a driving-shaft, an alining driven-shaft, a drum mounted on one of said shafts, a casing secured to the other shaft and inclosing said drum, a series of bands surrounding said drum and having one end engaging said casing, the position of the ends of each of said bands being located at circumferentially arranged points on said drum, a series of toggles engaging the free ends of said bands, and means adapted to engage said toggles and cause the same to force the ends of said bands together.

22. A power transmission device comprising a driving-shaft, an alining driven-shaft, a drum mounted on one of said shafts, a casing secured to the other shaft and inclosing said drum, a series of bands surrounding said drum and having one end engaging said casing, the position of the ends of each of said bands being located at circumferentially arranged points on said drum, a series of toggles engaging the free ends of said bands, and a series of plungers adapted to engage the knuckles of said toggles and cause the same to force the ends of said bands together.

In testimony whereof I have hereunto set my hand and seal this 31st day of December, A. D., 1907.

EDWARD PERCY WARNER. [L. S.]

Witnesses:
M. G. STOLL,
E. K. LUNDY.

It is hereby certified that in Letters Patent No. 917,205, granted April 6, 1909, upon the application of Edward Percy Warner, of Chicago, Illinois, for an improvement in "Power-Transmission Devices," an error appears in the printed specification requiring correction, as follows: On page 2, line 101, the words "means adapted to engage the ends of each of" should be stricken out and the following inserted instead, *tioned member, and longitudinally movable;* and that the said Letters Patent should be read with this correction th in that the same may conform to the record of the case in the Patent Office.

Signed and sealed this 11th day of May, A. D., 1909.

[SEAL.]

E. B. MOORE,
*Commissioner of Patents.*